US 9,154,494 B2

(12) United States Patent
Campagna et al.

(10) Patent No.: US 9,154,494 B2
(45) Date of Patent: *Oct. 6, 2015

(54) SELF-SIGNED IMPLICIT CERTIFICATES

(71) Applicant: Certicom Corp., Mississauga (CA)

(72) Inventors: Matthew John Campagna, Ridgefield, CT (US); Marinus Struik, Toronto (CA)

(73) Assignee: Certicom Corp., Mississauga, Ontario (CA)

( * ) Notice: Subject to any disclaimer, the term of this patent is extended or adjusted under 35 U.S.C. 154(b) by 212 days.

This patent is subject to a terminal disclaimer.

(21) Appl. No.: 13/856,915

(22) Filed: Apr. 4, 2013

(65) Prior Publication Data

US 2013/0227277 A1    Aug. 29, 2013

Related U.S. Application Data

(63) Continuation of application No. 12/774,568, filed on May 5, 2010, now Pat. No. 8,447,971.

(60) Provisional application No. 61/213,082, filed on May 5, 2009.

(51) Int. Cl.
*H04L 29/06* (2006.01)
*H04L 9/30* (2006.01)
*H04L 9/32* (2006.01)
*H04L 9/08* (2006.01)

(52) U.S. Cl.
CPC .......... *H04L 63/0823* (2013.01); *H04L 9/0861* (2013.01); *H04L 9/3066* (2013.01); *H04L 9/3252* (2013.01); *H04L 9/3265* (2013.01); *H04L 2209/60* (2013.01); *H04L 2209/64* (2013.01); *H04L 2209/80* (2013.01)

(58) Field of Classification Search
CPC . H04L 63/0823; H04L 9/0861; H04L 9/3066; H04L 9/3252; H04L 9/3265
See application file for complete search history.

(56) References Cited

U.S. PATENT DOCUMENTS

| | | | |
|---|---|---|---|
| 7,290,133 B1 * | 10/2007 | Montgomery | ................ 713/156 |
| 7,391,868 B2 | 6/2008 | Qu et al. | |
| 7,512,974 B2 | 3/2009 | Callaghan et al. | |
| 7,822,974 B2 | 10/2010 | Kinser et al. | |
| 2006/0253702 A1 | 11/2006 | Lowell et al. | |
| 2012/0036364 A1 | 2/2012 | Yoneda et al. | |

OTHER PUBLICATIONS

Mirzadeh et al; CPFP: "An Efficient Key Management Scheme for Large Scale Personal Networks"; pp. 744-748—IEEE published 2008.

(Continued)

*Primary Examiner* — Dede Zecher
*Assistant Examiner* — Abdullah Almamun
(74) *Attorney, Agent, or Firm* — Thomas Grzesik; Fleit Gibbons Gutman Bongini & Bianco P.L.

(57) ABSTRACT

There are disclosed systems and methods for creating a self-signed implicit certificate. In one embodiment, the self-signed implicit certificate is generated and operated upon using transformations of a nature similar to the transformations used in the ECQV protocol. In such a system, a root CA or other computing device avoids having to generate an explicit self-signed certificate by instead generating a self-signed implicit certificate.

19 Claims, 9 Drawing Sheets

(56) References Cited

OTHER PUBLICATIONS

Gunther, C.G.: "An Identity-Based Key-Exchange Protocol"; Advances in Cryptology—Eurocrypt '89; LNCS 434; pp. 29 to 37; Springer-Verlag, Germany; published 1990.

Girault, M.; "Self-Certified Public Keys", Advances in Cryptology—Eurocrypt '91; LNCS 547; pp. 490 to 497; Springer-Verlag, Germany; published 1991.

Struik, et al.; "Sec 4: Elliptic Curve Qu-Vanstone Implicit Certificate Scheme (ECQV), v0.91"; Nov. 18, 2008; p. 22; XP007914511; retrieved from http://www.secg.org/download/aid-775/sec4-ECQV-v091.pdf; retrieved Aug. 18, 2010; sections 1.1, 2.4, 2.5.

"Information Technology—Open Systems Interconnection—The Directory: Public-Key and attribute certificate frameworks; X.509 (Aug. 2005)"; ITU-T Standard in force (I), International Telecommunication Union, Geneva, CH. No. X.509 (Aug. 2005), Aug. 29, 2005, XP017405086, p. 6.

Qiang Huang and Johnas Cukier and Hisashi Kobayashi and Bede Liu and Jinyun Zhang Ed—Association for Computing Machinery: "Fast authenticated key establishment protocols for self-organizaing sensor networks", ACM WSNA 2003; Proceedings of the 2nd ACM Int'l workshop on wireless sensor networks and applications; New York; Jan. 1, 2003; pp. 141-150; XP009137731; ISBN: 978-1-58113-764-4, section 3.

International Search report and Written Opinion of the ISA mailed Sep. 1, 2010, in corresponding PCT patent application No. PCT/US2010/033754.

International Preliminary Report on Patentability mailed Nov. 17, 2011, in corresponding PCT patent application No. PCT/US2010/033754.

Corrected Version of the International Search report and Written Opinion mailed Sep. 29, 2010, in corresponding PCT patent application No. PCT/US2010/033754.

* cited by examiner

SELF-SIGNED IMPLICIT CERTIFICATES

CROSS-REFERENCE TO RELATED APPLICATIONS

This application is a continuation of U.S. patent application Ser. No. 12/774,568, filed on May 5, 2010, which claims priority from U.S. Provisional Application No. 61/213,082, filed on May 5, 2009, the entire contents of which are incorporated herein by reference.

TECHNICAL FIELD

The following relates generally to the generation of certificates in cryptographic systems.

BACKGROUND

A cryptographic system is a computer system that uses cryptography, typically to secure or authenticate data communication between a pair of computing devices connected to one another through a data communication link in the system. Each computing device has a cryptographic unit with the processing capacity to implement one or more cryptographic protocols used to secure or authenticate the data communication. The cryptographic protocols typically perform arithmetic operations on the bit strings representing parameters, messages, or data in the protocols to produce a bit string representing the output from the protocol.

In cryptographic systems, Certification Authorities (CAs) are trusted $3^{rd}$ parties responsible for vouching for the authenticity of public keys. For example, if correspondent A wishes to distribute its public key $Q_A$, correspondent A may request that a CA issue a certificate for public key $Q_A$. The certificate issued by the CA comprises a data portion and a signature portion. The data portion typically contains the identity of correspondent A, $ID_A$, as well as the public key of correspondent A, $Q_A$. The signature portion is created by signing the data portion using the CA's private key $k_{CA}$. The issued certificate therefore binds the identity information $ID_A$ of correspondent A to its public key $Q_A$ through the signature of the CA.

When another correspondent, say correspondent B, receives the certificate, it can verify the signature using the public key of the CA, $Q_{CA}$. Successful verification confirms that the data portion of the certificate has not been compromised and that therefore correspondent B has a valid and authentic copy of the public key $Q_A$ of correspondent A.

This type of certificate is referred to as a conventional or "explicit" certificate since correspondent B explicitly verifies the CA's signature on the certificate to authenticate $Q_A$. Assuming the CA has verified that correspondent A does indeed possess the private key $k_A$ associated with $Q_A$ then upon verification of the signature by correspondent B, correspondent B is also assured that correspondent A must possess the private key $k_A$ associated with $Q_A$.

In order for the scheme described above to operate securely, correspondent B must be sure that he possesses a valid and authentic copy of the public key $Q_{CA}$ of the CA. One way to achieve this is to have another CA in a higher security domain issue a certificate on public key $Q_{CA}$. For example, upon registration with the system, correspondent B may obtain the public key of a root CA, $Q_{CA_{root}}$. The root CA may then issue a certificate for $Q_{CA}$, as well as for the public keys of other CAs in the system. Correspondent B may then verify the authenticity of $Q_{CA}$ by using the public key $Q_{CA_{root}}$ of the root CA to verify the signature on the certificate issued by the root CA for the public key $Q_{CA}$. In this way, the root CA and its public key $Q_{CA_{root}}$ form a root of trust that sits on top of a hierarchy of CAs signed above and chaining to the root CA.

Since $Q_{CA_{root}}$ forms a root of trust, it is important that a correspondent or entity possessing $Q_{CA_{root}}$ can be sure that their copy of $Q_{CA_{root}}$ is authentic and valid. This is typically achieved by the root CA issuing a self-signed explicit certificate for its public key $Q_{CA_{root}}$. The self-signed explicit certificate is generated as the output of a trusted event, typically witnessed and recorded by company officers and external auditors on a trusted system. The issued explicit self-signed certificate comprises the root public key along with additional information that is signed by the corresponding root private key $k_{CA_{root}}$. This additional information typically includes information such as the validity period of the key and/or key use restrictions. The recipient receives the self-signed explicit certificate, parses out the root public key $Q_{CA_{root}}$, and then uses the root public key $Q_{CA_{root}}$ to verify the additional information by verifying the signature.

Certain types of implicit certificates are also known in the art as an alternative way of distributing public keys. These implicit certificates require no explicit verification of the CA's signature, and therefore have the advantage that they are smaller in size and therefore offer bandwidth savings over conventional explicit certificates. A public key distributed via such an implicit certificate is implicitly authenticated by successfully using the public key in an operation that requires the use of the corresponding private key.

A well-known implicit certificate scheme is Elliptic Curve Qu-Vanstone (ECQV). This scheme is used to provide implicit authentication when the certificate is used in conjunction with an operation requiring the sender to use the corresponding private key, such as in ECDH, ECMQV, or ECDSA operations. A summary of ECQV is as follows.

A correspondent, A, wishing to establish a private/public key pair $(k_A, Q_A)$ and distribute public key $Q_A$ via an implicit certificate, first uses its random number generator to generate a random bit string to be used as an ephemeral private key $d_A$. The cryptographic unit then generates a corresponding ephemeral public key $G_A = d_A G$, where G is the base point on the underlying elliptic curve and a generator of the subgroup of the elliptic curve group. Correspondent A then sends $G_A$, as well as any identity information, to the CA. The CA receives $G_A$ and the identity information and performs the following steps:

1. Verify the received ephemeral public key $G_A$ and identity information. Verification can be done a number of ways. For example, the CA may verify that $G_A$ is a proper public key that satisfies specific criteria, such as being a point on the underlying elliptic curve, and/or satisfies defined statistical criteria.
2. Generate an ephemeral key pair (d, Q), where Q=dG.
3. Compute public-key reconstruction value $B_A = Q + G_A$.
4. Construct correspondent A certificate data $I_A$ (e.g. identity and validity information).
5. Format an implicit certificate $IC_A$ containing $B_A$ and $I_A$.
6. Compute e=Hash($IC_A$).
7. Compute private key contribution data s=e$d$+$k_{CA}$ (mod n), where n is the order of base point G, and $k_{CA}$ is the private key of the CA.
8. Send $IC_A$ and s to correspondent A.

Upon receiving $IC_A$ and s, correspondent A performs the following steps to calculate its key pair $(k_A, Q_A)$:

1. Parse out $B_A$ and $I_A$ from $IC_A$.
2. Verify the content of $I_A$ according to the application rules. For example, this may include verifying the information is properly formatted, and/or verifying the content of $I_A$ matches the information sent by correspondent A to the CA.

3. Verify $B_A$ is a valid point on the underlying curve.
4. Compute $e=\text{Hash}(IC_A)$ and verify $e \neq 0$.
5. Compute its private key $k_A=ed_A+s \pmod{n}$.
6. Compute its corresponding public key $Q_A=eB_A+Q_{CA}$, where $Q_{CA}$ is the public key of the CA.

The CA distributes the implicit certificate $IC_A$ to the other correspondents. A particular correspondent, say correspondent B, receives $IC_A$ and derives the public key $Q_A$ of correspondent A as follows:

1. Parse out $B_A$ and $I_A$ from $IC_A$;
2. Verify the content of $I_A$ according to the application rules, and verify $B_A$ is a valid point on the underlying curve;
3. Compute $e=\text{Hash}(IC_A)$ and verify $e \neq 0$; and
4. Compute public key $Q_A=eB_A+Q_{CA}$, where $Q_{CA}$ is the public key of the CA.

Correspondent B is therefore able to use the public key $Q_{CA}$ of the CA to derive $Q_A$ from the implicit certificate $IC_A$. However, correspondent B has no way of knowing whether correspondent A possesses the corresponding private key $k_A$. Therefore, authentication of correspondent A and its public key $Q_A$ is not complete until an operation involving both $Q_A$ and $k_A$ is successfully performed. For example, correspondent A and correspondent B may subsequently engage in an ECMQV key agreement or ECDSA signature protocol, both of which require the use of $Q_A$ and $k_A$. If the key agreement or signature operations fail, then $Q_A$ is not considered to be authentic or valid. On the other hand, if the key agreement or signature operations are successful, then correspondent A must possess $k_A$, and the authenticity and validity of $Q_A$ is implicitly verified.

Even though the CAs in such a system issue implicit certificates as above, the root CA must still distribute its root public key $Q_{CA_{root}}$ in a manner that binds the identity and validity information of $Q_{CA_{root}}$ to the root CA. Therefore, as described earlier, this is done by the root CA issuing a self-signed explicit certificate that is generated as the output of a trusted event. However, as mentioned earlier, an explicit certificate does not possess the bandwidth savings of an implicit certificate. Moreover, the transformations necessary to generate and operate on the self-signed explicit certificate do not complement the transformations necessary to generate and operate on the implicit certificates.

BRIEF DESCRIPTION

Representative embodiments will now be described by way of example only with reference to the accompanying drawings, in which.

DETAILED DESCRIPTION

In general terms, the following provides methods for generating and operating upon a self-signed implicit certificate. In one embodiment, the self-signed implicit certificate is generated by a root CA and is operated upon using transformations of a nature similar to the transformations used in the ECQV protocol. In this way, a root CA avoids having to generate an explicit self-signed certificate by instead generating a self-signed implicit certificate.

Systems are also disclosed for performing the methods, as well as a computer readable medium having stored thereon instructions for performing the methods.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that that any module, component, or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

Figure 1:
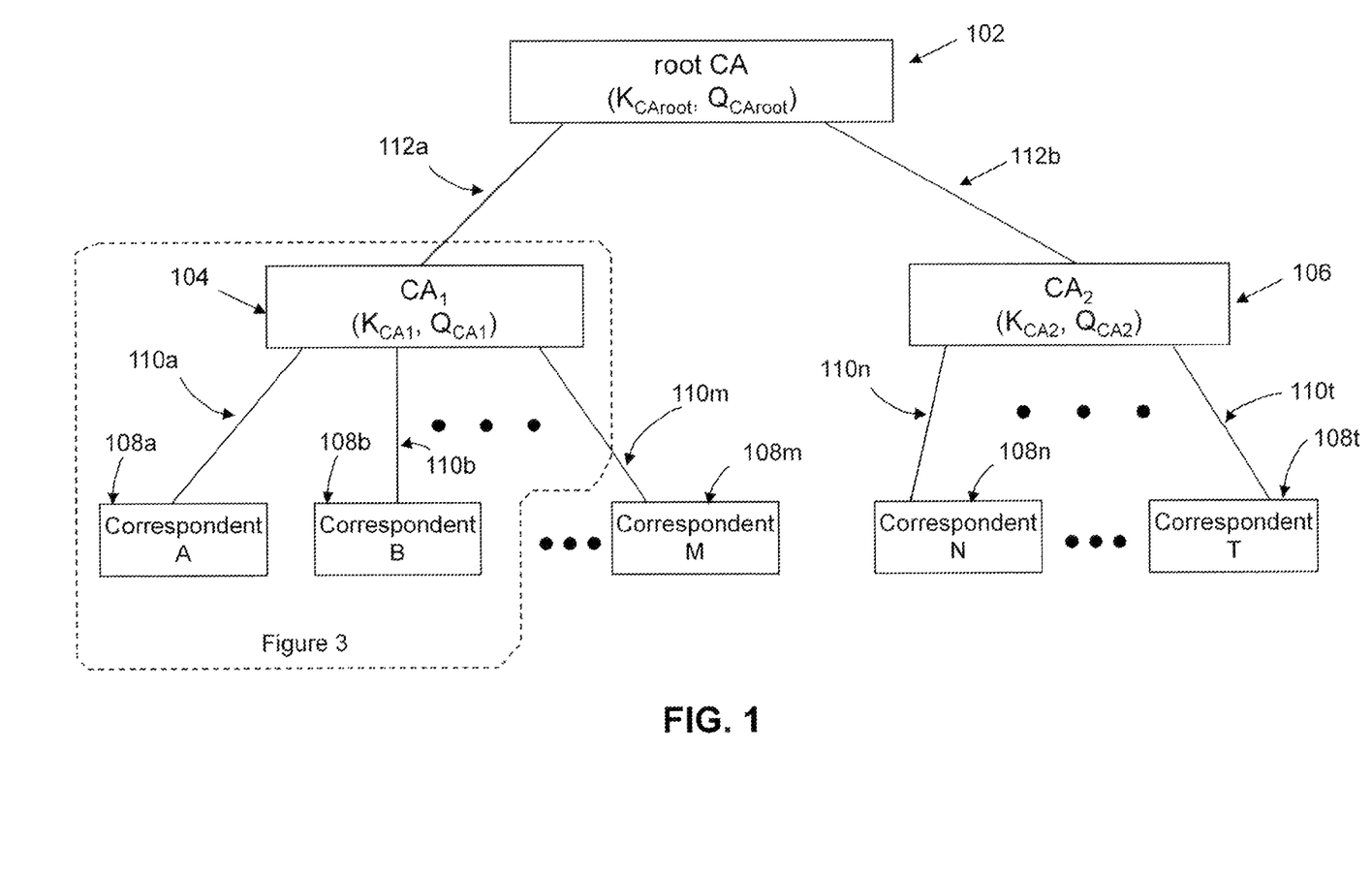
FIG. 1 is a schematic representation of a network of computing devices organized in a hierarchical trust model.

Turning therefore to FIG. 1, an embodiment of a simple hierarchical trust model is shown. A root CA 102 is shown having two branch CAs 104 and 106. Correspondents 108*a-m* operate under CA 104 and correspondents 108*n-t* operate under and CA 106. It will be appreciated that m and t represent arbitrary integers. Root CA 102 has long-term private/public key pair $(k_{CA_{root}}, Q_{CA_{root}})$, which is obtained during generation of a self-signed implicit certificate as described in detail below. CA 104 has long-term private/public key pair $(k_{CA1}, Q_{CA1})$ and CA 106 has long-term private/public key pair $(k_{CA2}, Q_{CA2})$.

Figure 2:
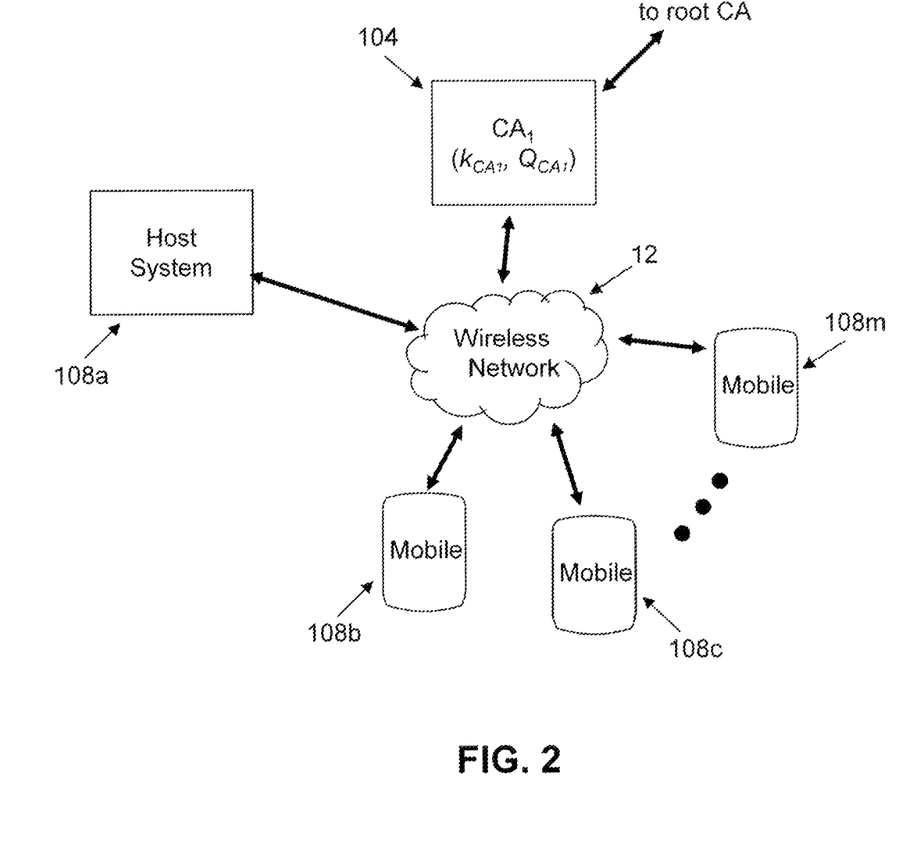
FIG. 2 is a schematic representation of one specific example of the network of FIG. 1.

FIG. 2 shows an example of one specific implementation of the network of FIG. 1 in which correspondent 108a is an enterprise computer system (host system), and correspondents 108b-m are mobile devices. In the specific implementation shown in FIG. 2, the host system 108a provides a host service that offers push-based messages for mobile devices 108b-m. The host service is capable of notifying and presenting data to a user in real-time at a given mobile device when the data arrives at the host system 108a. The host system 108a and mobile devices 108b-m exchange public keys using certificates issued by the CA 104.

The embodiment shown in FIG. 2 is one specific implementation. More generally, and returning to FIG. 1, each of the CAs 102, 104, and 106, and correspondents 108a-t are computing devices that implement a public key cryptographic system based on the intractability of the discrete logarithm problem in an elliptic curve group defined over a finite field, commonly referred to as an elliptic curve cryptosystem or ECC. As such, a private key k is used to generate a corresponding public key Q by performing a k-fold group operation on a generator G of the group of order n. The elliptic curve group is usually defined with an additive operation so that Q=kG.

In the embodiment shown in FIG. 1, implicit certificates for public keys are issued and operated on according to the ECQV implicit certificate scheme, which itself is known in the art and summarized earlier. For example, correspondent 108a can send a request to CA 104 to issue an implicit certificate $IC_A$ on which correspondent 108a can subsequently operate to obtain a private/public key pair ($k_A$, $Q_A$) and on which other correspondents can operate to obtain public key $Q_A$, as described in the ECQV protocol. Correspondent 108a therefore sends to CA 104, along with the request, an ephemeral key $G_A$ and its identity information. CA 104 then issues implicit certificate $IC_A$ according to the ECQV protocol described earlier and sends the implicit certificate $IC_A$ and private contribution data s to correspondent 108a. The correspondent 108a uses the private key contribution data s and the implicit certificate $IC_A$ to compute its private key $k_A$. CA 104 may then send implicit certificate $IC_A$ to one or more of the other correspondents 108b-t. Any one of the other correspondents, for example correspondent 108b, can use $IC_A$ to compute $Q_A$ and therefore permit secure communication or verification of signatures.

Figure 3:
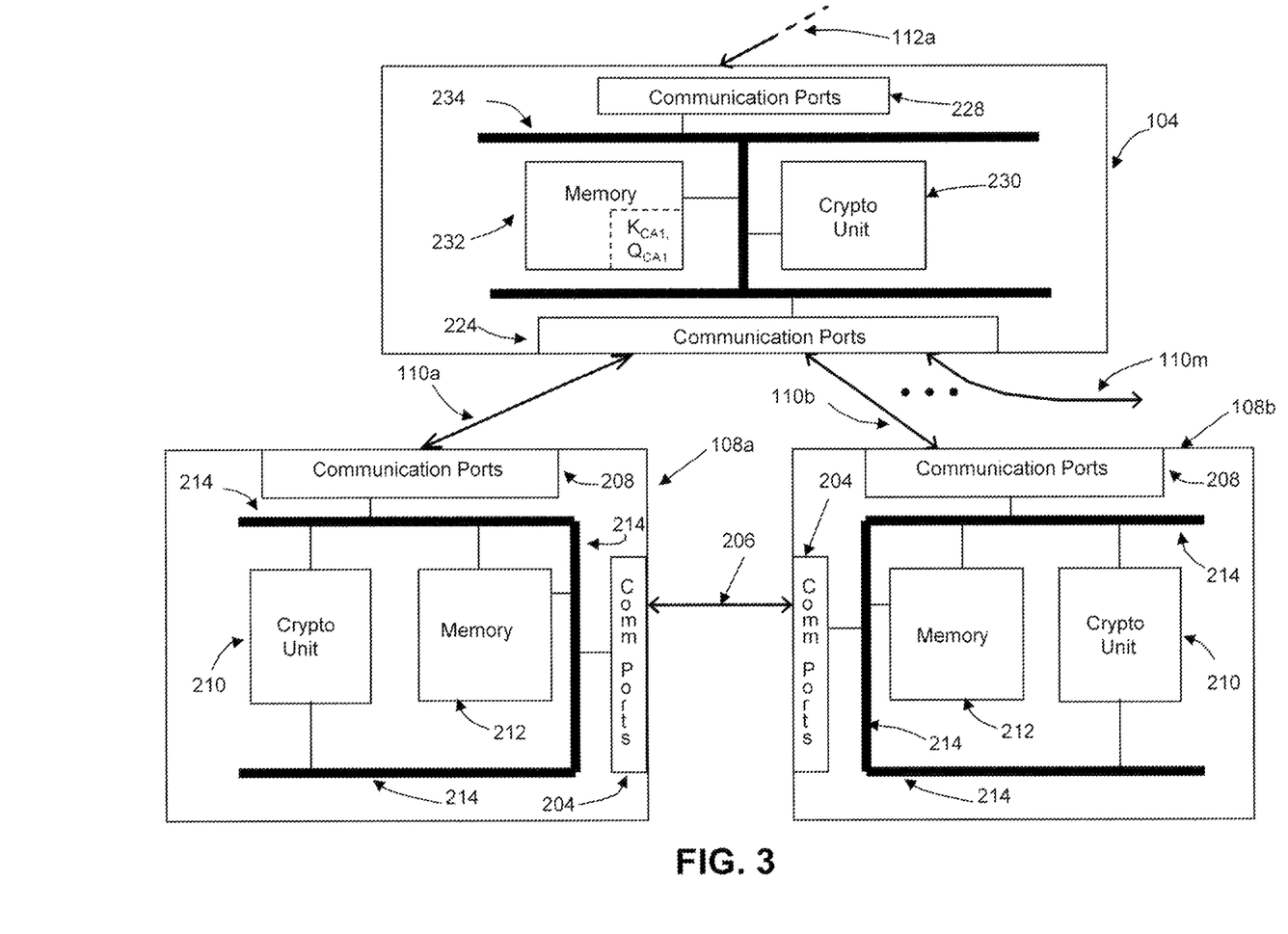
FIG. 3 is a schematic representation of the computing devices shown in FIG. 1.

Correspondents 108a and 108b, as well as CA 104, are shown in greater detail in FIG. 3. Correspondents 108a and 108b each comprise: communication ports 204 for communicating with each other over communication channel 206; a communication port 208 for communicating with CA 104 over channels 110a and 110b respectively; a cryptographic processing unit 210 for performing operations operating on the elliptic curve group E defined over a chosen field; memory 212 for storing the results of such cryptographic operations and for storing information received via ports 204 and 208; and internal buses 214 for communicating information internally. Each correspondent 108a and 108b also communicates with other correspondents via communication ports 204, as well as with the root CA 102 (not shown). The channels 110a, 110b, and 206 may or may not be secure. Additionally, the cryptographic processing unit 210 may be hardware, computer readable software instructions, or a combination of both that is configured to perform cryptographic operations such as those described in detail below.

Similarly, CA 104 comprises: communication ports 224 for communicating with each of the correspondents 108a-m over channels 110a-m; a communication port 228 for communicating with root CA 102 over channel 112a, which may or may not be secure; a cryptographic processing unit 230 for performing operations operating on the elliptic curve group E defined over a chosen field; memory 232 for storing the results of such cryptographic operations and for storing information received via ports 224 and 228; and internal buses 234 for communicating information internally. As above, the cryptographic processing unit 230 may be hardware, computer readable software instructions embodied in fixed form on a data carrier or in a memory, or a combination of both that is configured to perform cryptographic operations such as those described in detail below.

Although not shown in detail in the figures, the internal structure of CA 106 and root CA 102 is similar to CA 104, and the internal structure of correspondents 108c-t is similar to correspondents 108a and 108b.

Upon registering with the system, each correspondent 108a-t receives a self-signed implicit certificate from root CA 102, which each correspondent 108a-t operates on to compute $Q_{CA_{root}}$. The generation of this self-signed implicit certificate by the root CA 102, as well as the process by which the self-signed implicit certificate is operated on to derive $Q_{CA_{root}}$, is explained in full detail below with reference to FIGS. 4 and 5.

The public key $Q_{CA_{root}}$ of the root CA 102 is stored in memory 212 by each correspondent 108a-t. $Q_{CA_{root}}$ can subsequently be used by each correspondent 108a-t to operate on implicit certificates issued by the root CA 102 according to the ECQV protocol and to begin a chain of trust. For example, assume correspondent 108t receives an implicit certificate issued by CA 104 for the public key $Q_A$ of correspondent 108a. Correspondent 108t does not necessarily have a copy of the public key $Q_{CA1}$ of CA 104 or does not necessarily have a copy of $Q_{CA1}$ that it can be sure is authentic and valid. However, root CA 102 can compute and issue an implicit certificate for public key $Q_{CA1}$ and send this implicit certificate to correspondent 108t. Correspondent 108t can then operate on this implicit certificate using $Q_{CA_{root}}$ to obtain a valid and authentic copy of $Q_{CA1}$, which it can then use to operate on the implicit certificate issued by CA 104 to obtain public key $Q_A$. In this way, $Q_{CA_{root}}$ is used to initiate a chain of trust: correspondent 108t uses its valid and authentic copy of $Q_{CA_{root}}$ to obtain a valid and authentic copy of $Q_{CA1}$, which is used to obtain a valid and authentic copy of $Q_A$.

Figure 4:
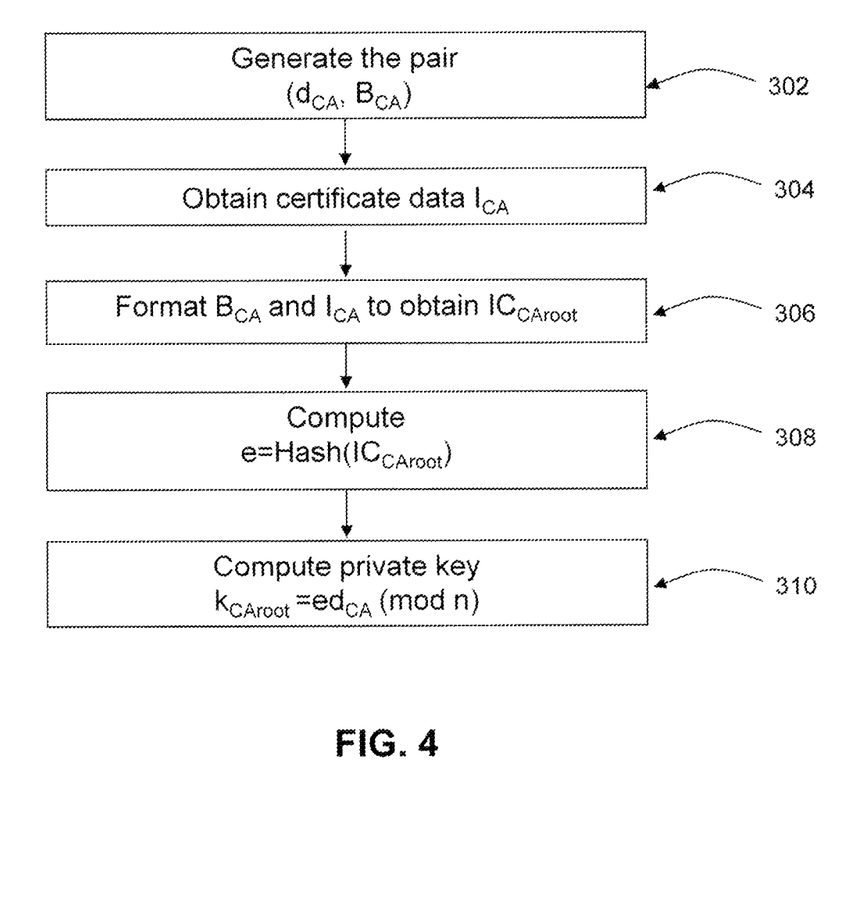
FIG. 4 is a schematic of an embodiment of a method of generating a self-signed implicit certificate.

It is clear that correspondent 108t must begin with a valid and authentic copy of $Q_{CA_{root}}$ in order for the chain of trust to be secure. The public key $Q_{CA_{root}}$ of the root CA 102 is therefore distributed via a self-signed implicit certificate issued by the root CA 102, which is the output of a trusted event. Conveniently, though, this self-signed implicit certificate is generated using transformations of a nature similar to the transformations used in the ECQV protocol. The steps performed by the root CA 102 to generate a self-signed implicit certificate are described in detail below with reference to FIG. 4. FIG. 4 can comprise a set of computer readable instructions executed by the root CA 102.

In step 302, the cryptographic unit 230 of root CA 102 first generates a private/public key pair ($d_{CA}$, $B_{CA}$). $d_{CA}$ is an ephemeral bit string representing an integer, typically generated using a random number generating module within cryptographic unit 230, and $B_{CA}$, a public-key reconstruction value, is calculated by unit 230 by performing a $d_{CA}$-fold operation on a bit string representing the generator G to obtain $B_{CA}=d_{CA}G$. $B_{CA}$ is itself a public key. It is utilized in generating the self-signed implicit certificate and computing the public key $Q_{CA_{root}}$. The values $B_{CA}$ and $d_{CA}$ are temporarily stored, for example, in memory 232.

In step 304, root CA 102 next obtains or creates certificate data $I_{CA}$ for its self-signed certificate. The certificate data $I_{CA}$ includes information specific to the certificate. For example, the certificate information can include information such as: identification information, the validity period of the certificate, and/or the intended use of the public key.

Next, in step 306, root CA 102 operates on $B_{CA}$ and $I_{CA}$ to generate a self-signed implicit certificate $IC_{CA_{root}}$. This may be as simple as concatenating data values $B_{CA}$ and $I_{CA}$, e.g., $IC_{CA_{root}} = B_{CA} \| I_{CA}$. It will be appreciated that a compressed or encoded version of $B_{CA}$ can be used in place of $B_{CA}$, as long as $B_{CA}$ can be derived by a recipient of the self-signed implicit certificate from the compressed or encoded version of $B_{CA}$. For example, the certificate may include a compressed or encoded octet string derived from $B_{CA}$, for example, perhaps the x-coordinate of $B_{CA}$ along with a single bit representing the y-coordinate of $B_{CA}$.

In step 308, cryptographic unit 230 of root CA 102 then calculates intermediate integer value $e = \text{Hash}(IC_{CA_{root}})$, where Hash( ) is a hash function. It is contemplated the e could instead be a truncated version of $\text{Hash}(IC_{CA_{root}})$. The intermediate value e is stored temporarily, for example, in memory 232.

Finally, in step 310, cryptographic unit 230 uses integers $d_{CA}$ and e to compute its private key $k_{CA_{root}}$ according to the formula $k_{CA_{root}} = ed_{CA} \pmod n$, where n is the order of base point G.

Figure 5:
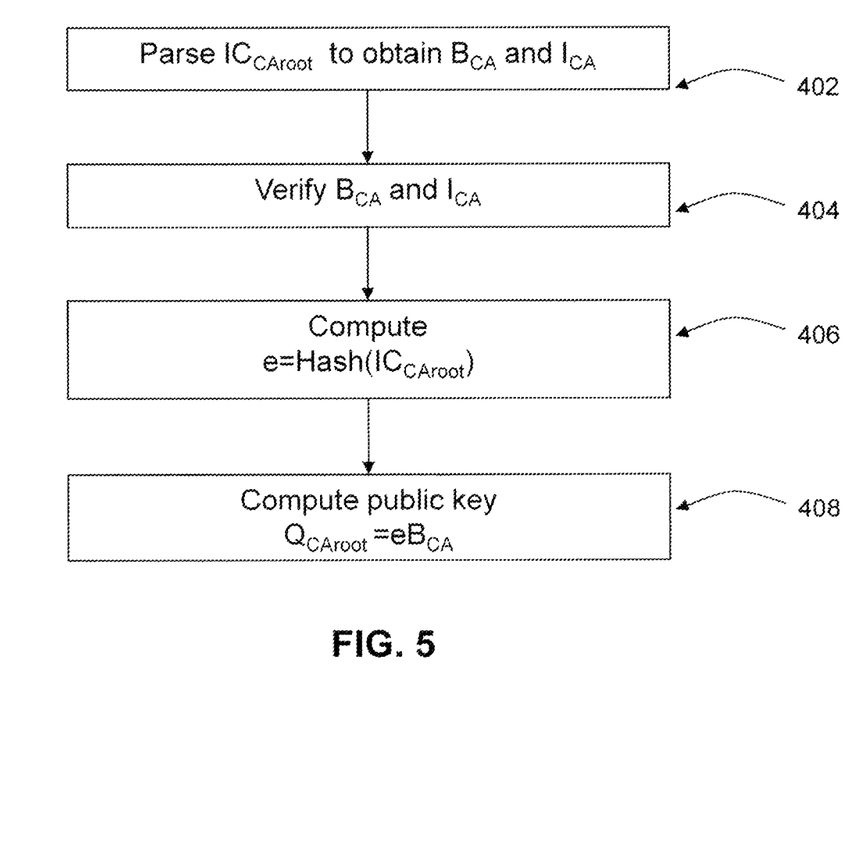
FIG. 5 is a schematic of an embodiment of a method of deriving a public key from a self-signed implicit certificate.

As will be shown in FIG. 5, the public key $Q_{CA_{root}}$ corresponding to private key $k_{CA_{root}}$ is computable by any party having the implicit certificate $IC_{CA_{root}}$.

Root CA 102 then sends its self-signed implicit certificate $IC_{CA_{root}}$ to each correspondent, including to correspondent 108t.

Upon receiving self-signed implicit certificate $IC_{CA_{root}}$, correspondent 108t performs the following steps described below with reference to FIG. 5 to obtain $Q_{CA_{root}}$. As will be seen, conveniently, the steps performed by correspondent 108t involve transformations of a nature similar to the transformations used in the ECQV protocol. FIG. 5 can comprise a set of computer readable instructions executed by the correspondent 108t.

In step 402, the cryptographic unit 210 of correspondent 108t operates on $IC_{CA_{root}}$ to obtain values $B_{CA}$ and $I_{CA}$. For example, if the self-signed implicit certificate is of the form $IC_{CA_{root}} = B_{CA} \| I_{CA}$, the cryptographic unit 210 simply parses out the values $B_{CA}$ and $I_{CA}$. If the self-signed implicit certificate includes a compressed or encoded version of $B_{CA}$, the cryptographic unit 210 operates on this compressed or encoded version of $B_{CA}$ to obtain $B_{CA}$.

In step 404, correspondent 108t then verifies the contents of $I_{CA}$ according to application rules. For example, correspondent 108t may verify the identity and validity period. In some embodiments, the correspondent 108t also verifies that $B_{CA}$ is a valid point on the underlying curve.

Next, in step 406, cryptographic unit 210 of correspondent 108t then calculates intermediate value $e = \text{Hash}(IC_{CA_{root}})$, verifies $e \neq 0$, and stores e temporarily, for example, in memory 212. As explained earlier, it is contemplated the e could instead be a truncated version of $\text{Hash}(IC_{CA_{root}})$.

Finally, in step 408, cryptographic unit 210 uses e and $B_{CA}$ to compute public key $Q_{CA_{root}}$ corresponding to private key $k_{CA_{root}}$ according to the formula $Q_{CA_{root}} = eB_{CA}$.

Thus, by performing steps 402 to 408, correspondent 108t obtains the public key $Q_{CA_{root}}$ of root CA 102 by operating on self-signed implicit certificate $IC_{CA_{root}}$. The self-signed implicit certificate $IC_{CA_{root}}$ binds the identification and validity information of root CA 102 to $Q_{CA_{root}}$ through $I_{CA}$. As is clear from FIG. 5, correspondent 108t can operate on $IC_{CA_{root}}$ itself without using another public key to compute $Q_{CA_{root}}$.

Upon the completion of step 408, correspondent 108t may then use $Q_{CA_{root}}$ obtained via FIG. 5 to initiate a chain of trust. For example, the root CA 102 may use its private key $k_{CA_{root}}$, which was obtained by the method shown in FIG. 4, to issue an implicit certificate $IC_{CA1}$ for the public key $Q_{CA1}$ of CA 104 according to the ECQV protocol. Correspondent 108t may then operate on $IC_{CA1}$ using $Q_{CA_{root}}$ and the ECQV protocol to obtain a valid and authentic copy of $Q_{CA1}$. The public key $Q_{CA1}$ of CA 104 may then be used by correspondent 108t to operate on implicit certificates issued by CA 104.

As discussed above, the transformations shown in FIGS. 4 and 5 are of a nature similar to the transformations used in the ECQV protocol. This is particularly convenient when implementing self-signed implicit certificates in existing ECQV schemes. Whilst not necessary, by using transformations of a nature similar to the transformations used in the ECQV protocol, the self-signed implicit signature scheme is more simply and efficiently implemented in existing ECQV schemes. Additionally, the issuance of a self-signed implicit certificate by the root CA offers bandwidth savings over issuing self-signed explicit certificates.

In an alternative embodiment, it is contemplated that the self-signed implicit signature scheme described in FIGS. 4 and 5 may also be used to implement short-lived root certificates without the need to re-issue full certificates. In such an embodiment, in step 304 of FIG. 4, when the root CA 102 creates its certificate data $I_{CA}$, the root CA 102 also formats into $I_{CA}$ time-sensitive information, such as the current date. On a daily basis, this value is updated and cryptographic unit 230 of root CA 102 repeats steps 308 to 312 to yield updated private key $k_{CA_{root}}$. Similarly, correspondent 108t also updates the $I_{CA}$ field of $IC_{CA_{root}}$ on a daily basis and repeats steps 406 and 408 of FIG. 4 to yield updated public key $Q_{CA_{root}}$. This ensures keys $k_{CA_{root}}$ and $Q_{CA_{root}}$ remain fresh.

In a further embodiment, it is contemplated that the root CA 102 runs multiple security domains using a single long-term private key $r_{CA_{root}}$, where $r_{CA_{root}}$ is used in place of $d_{CA}$ in step 302 of the self-sign transformation of FIG. 4. For example, assume root CA 102 wishes to establish two security domains, one for correspondents 108a-m and one for correspondents 108n-t. Root CA 102 can issue two different public keys $Q^1_{CA_{root}}$ and $Q^2_{CA_{root}}$, one for each domain, simply by repeating the steps of FIG. 4 with two different certificate data values $I_{CA1}$ and $I_{CA2}$. Root CA 102 first uses $d_{CA} = r_{CA_{root}}$ and $I_{CA1}$ to generate a self-signed implicit certificate $IC^1_{CA_{root}}$ as described in FIG. 4, and this self-signed implicit certificate $IC^1_{CA_{root}}$ is sent to correspondents 108a-m to be operated on to obtain $Q^1_{CA_{root}}$. Root CA 102 then uses $d_{CA} = r_{CA_{root}}$ and $I_{CA2}$ to generate a self-signed implicit certificate $IC^2_{CA_{root}}$ as described in FIG. 4 and sends $IC^2_{CA_{root}}$ to correspondents 108n-t to be operated on to obtain $Q^2_{CA_{root}}$.

In the embodiments described with reference to FIGS. 4 and 5, the private key $k_{CA_{root}}$ of the root CA 102 is an integer calculated as $k_{CA_{root}} = ed_{CA} \pmod n$, and the corresponding public key $Q_{CA_{root}}$ of root CA 102 is an element of the group calculated as $Q_{CA_{root}} = eB_{CA}$. More generally, it is contemplated that instead the private key $k_{CA_{root}}$ can be an integer calculated as $k_{CA_{root}} = ed_{CA} + r \pmod n$ and the corresponding public key can be calculated as $Q_{CA_{root}} = eB_{CA} + rG$, where r is an integer parameter, possibly private to the root CA 102, and rG is a public or publicly computable value. For example, r can be 0, 1, or $d_{CA}$. If r=0, the private/public key pair ($k_{CA_{root}}$, $Q_{CA_{root}}$) is of the form shown in FIGS. 4 and 5. If r=1, then $k_{CA_{root}} = ed_{CA} + 1 \pmod n$ and $Q_{CA_{root}} = eB_{CA} + G$. And if $r = d_{CA}$, then $k_{CA_{root}} = ed_{CA} + d_{CA} \pmod n$ and $Q_{CA_{root}} = eB_{CA} + B_{CA}$.

The embodiments described above can be considered special cases of a more general protocol that advantageously follows many of the transformations used in the ECQV protocol. This general protocol is described with reference to FIGS. 6 and 7.

Figure 6:
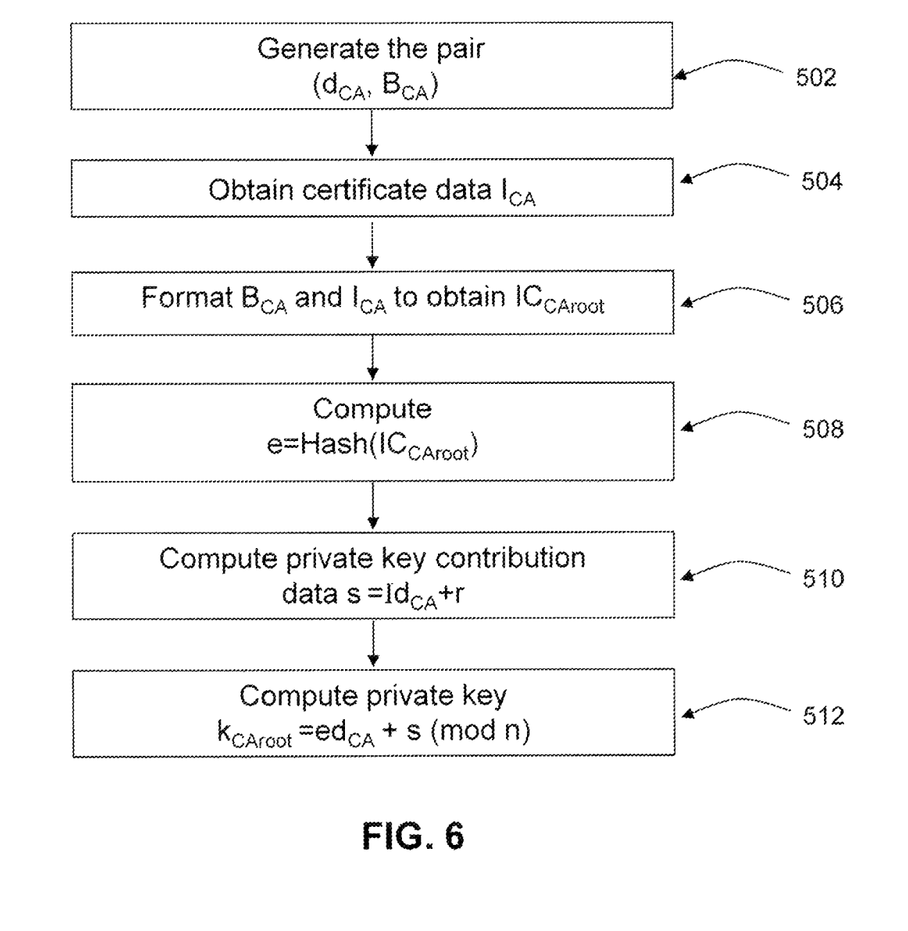
FIG. 6 is a schematic of another embodiment of a method of generating a self-signed implicit certificate.

Assume root CA 102 wishes to establish a private/public pair $(k_{CA_{root}}, Q_{CA_{root}})$ and issue a self-signed implicit certificate $IC_{CA_{root}}$ for its public key $Q_{CA_{root}}$. The root CA 102 therefore performs the steps described in detail below with reference to FIG. 6. FIG. 6 can comprise a set of computer readable instructions executed by the root CA 102.

In step 502, the cryptographic unit 230 of root CA 102 first generates a private/public key pair $(d_{CA}, B_{CA})$. $d_{CA}$ is an ephemeral bit string representing an integer, typically generated using a random number generating module within cryptographic unit 230, and $B_{CA}$, a public-key reconstruction value, is calculated by unit 230 as $B_{CA} = d_{CA} G$.

In step 504, root CA 102 next obtains or creates certificate data $I_{CA}$ for its self-signed certificate. The certificate data $I_{CA}$ includes information specific to the certificate. For example, the certificate information can include information such as: identification information, the validity period of the certificate, and/or the intended use of the public key.

Next, in step 506, root CA 102 operates on $B_{CA}$ and $I_{CA}$ to generate a self-signed implicit certificate $IC_{CA_{root}}$. This may be as simple as concatenating data values $B_{CA}$ and $I_{CA}$, e.g., $IC_{CA_{root}} = B_{CA} \| I_{CA}$. It will be appreciated that a compressed or encoded version of $B_{CA}$ can be used in place of $B_{CA}$, as long as $B_{CA}$ can be derived by a recipient of the self-signed implicit certificate from the compressed or encoded version of $B_{CA}$.

In step 508, cryptographic unit 230 of root CA 102 then calculates intermediate integer value $e = \text{Hash}(IC_{CA_{root}})$, where Hash( ) is a hash function. It is contemplated the e could instead be a truncated version of $\text{Hash}(IC_{CA_{root}})$.

Next, in step 510, cryptographic unit 230 computes private key contribution data s as $s = \alpha d_{CA} + r \pmod{n}$, where $\alpha$ is a publicly computable integer, and r is an integer parameter, possibly private to the root CA 102.

Finally, in step 512, cryptographic unit 230 compute its private key $k_{CA_{root}}$ using ephemeral public key $d_{CA}$ and private key contribution data s according to the formula $k_{CA_{root}} = e d_{CA} + s \pmod{n}$, where n is the order of base point G.

Figure 7:
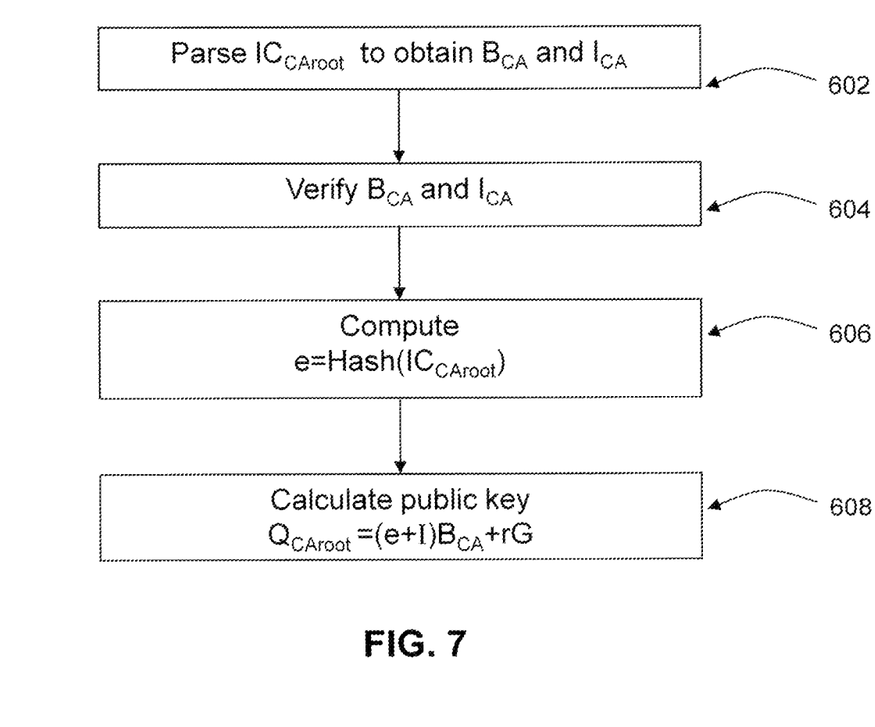
FIG. 7 is a schematic of another embodiment of a method of deriving a public key from a self-signed implicit certificate.

A correspondent in the cryptographic system, say correspondent 108t, can operate upon the self-signed implicit certificate $IC_{CA_{root}}$ to obtain $Q_{CA_{root}}$ by performing the steps described below with reference to FIG. 7. FIG. 7 can comprise a set of computer readable instructions executed by the correspondent 108t.

In step 602, the cryptographic unit 210 of correspondent 108t operates on $IC_{CA_{root}}$ to obtain values $B_{CA}$ and $I_{CA}$. For example, if the self-signed implicit certificate is of the form $IC_{CA_{root}} = B_{CA} \| I_{CA}$, the cryptographic unit 210 simply parses out the values $B_{CA}$ and $I_{CA}$.

In step 604, correspondent 108t then verifies the contents of $I_{CA}$ according to application rules.

Next, in step 606, cryptographic unit 210 of correspondent 108t then calculates intermediate value $e = \text{Hash}(IC_{CA_{root}})$. As explained earlier, it is contemplated the e could instead be a truncated version of $\text{Hash}(IC_{CA_{root}})$.

Finally, in step 608, cryptographic unit 210 obtains $\alpha$ and rG, and uses these values along with e and $B_{CA}$ to compute public key $Q_{CA_{root}}$ corresponding to private key $k_{CA_{root}}$ according to the formula $Q_{CA_{root}} = (e+\alpha) B_{CA} + rG$.

Thus, by performing steps 602 to 608, correspondent 108t obtains the public key $Q_{CA_{root}}$ of root CA 102 by operating on self-signed implicit certificate $IC_{CA_{root}}$.

It will be observed that the protocol described with reference to FIGS. 6 and 7 reduces to the protocol described with reference to FIGS. 4 and 5 when $\alpha = r = 0$. However, in general, other agreed-upon integer values of $\alpha$ and r can utilized to obtain other values for key pair $(k_{CA_{root}}, Q_{CA_{root}})$. For example, if $\alpha = e$ and $r = 0$, then $k_{CA_{root}} = 2 e d_{CA}$ and $Q_{CA_{root}} = 2 e B_{CA}$.

Although the invention has been described with reference to certain specific embodiments, various modifications thereof will be apparent to those skilled in the art without departing from the spirit and scope of the invention as outlined in the claims appended hereto.

For example, it will be appreciated that the self-signed implicit certificate schemes described above can be implemented in any trust model or topology, not just hierarchical trust models such as that shown in FIG. 1. Generally, in any trust model or topology in which a particular CA needs to issue a root public key or a public key having an equivalent purpose, the above-described method may be used.

More generally, it will be appreciated that the self-signed implicit certificates described above are not limited to self-signed implicit certificates issued by Certification Authorities per se. Instead, self-signed implicit certificate generation can be implemented in any computing device wishing to issue a self-signed public key bound to associated information or data. The associated information will most likely be, but is not limited to, information relating to the identity and/or validity of the public key. For example, in Pretty Good Privacy (PGP) systems, a correspondent may issue a self-signed implicit certificate for its public key. This correspondent is not Certification Authority per se, but is rather a correspondent wishing to distribute its public key using a self-signing technique.

Therefore, it will be appreciated that any of the methods described above with reference to FIGS. 4 to 7 can be implemented by a computing device in the cryptographic communication system. Instead of generating "certificate data", data I relating to the public key is generated. This data I is combined with the public-key reconstruction value B to obtain a self-signed implicit certificate IC, which can be operated upon directly to obtain the public key Q of the computing device. Therefore, as used herein, the term "certificate", such as in "implicit certificate", is not limited to that which is issued by a Certification Authority, but generally extends to a public key bound to particular data, such as the identity of the owner of the public key, issued by a computing device in a cryptographic system.

It will also be appreciated that the techniques described above are not limited to elliptic curve systems, but may be extended to non-elliptic curve discrete logarithmic systems (e.g. systems based on an underlying multiplicative group) using straight-forward modifications apparent to a person skilled in the art having the benefit of the present disclosure.

Figure 8:
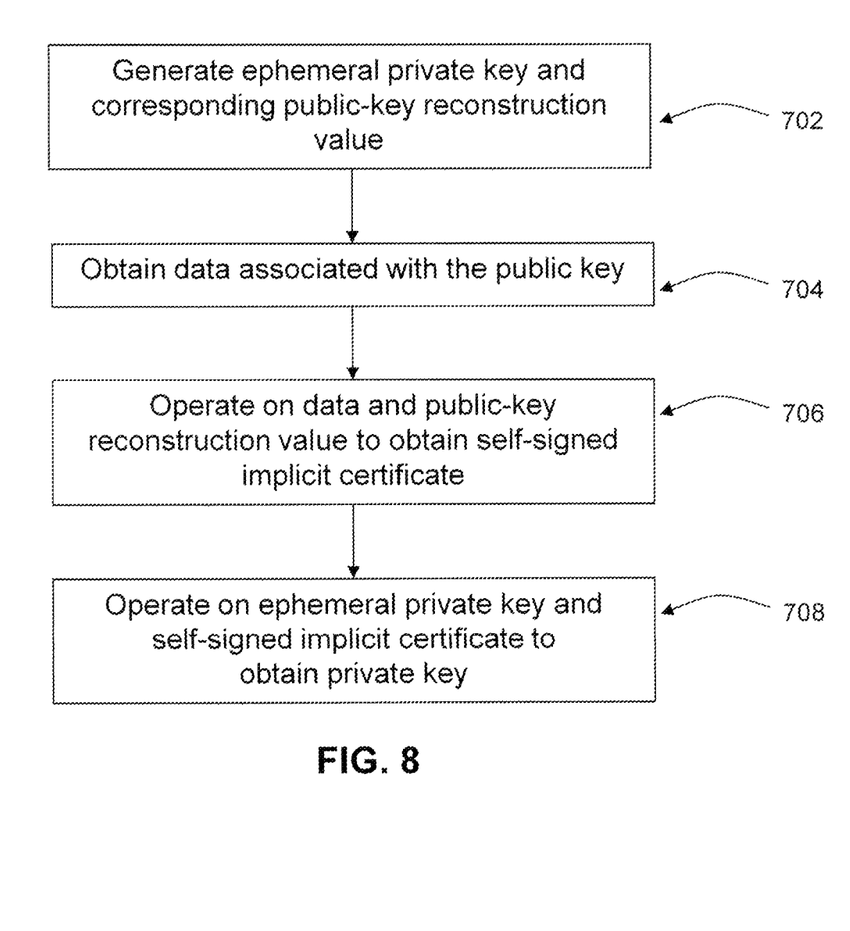
FIG. 8 is a schematic of yet another embodiment of a method of generating a self-signed implicit certificate.

Therefore, in view of the above embodiments, FIG. 8 discloses generally a method of generating a private key and establishing a self-signed implicit certificate that can be operated on to obtain a corresponding public key. The method is performed by a computing device in the cryptographic system and includes the following steps. In step 702, the computing device generates an ephemeral private key and a corresponding public-key reconstruction value. Then, in step 704, the computing device obtains data associated with the public key. Next, in step 706, the computing device operates on the public-key reconstruction value and the certificate data to obtain the self-signed certificate. Finally, in step 708, the computing device operates on the ephemeral private key and the self-signed implicit certificate in its cryptographic unit to obtain the private key.

Figure 9:
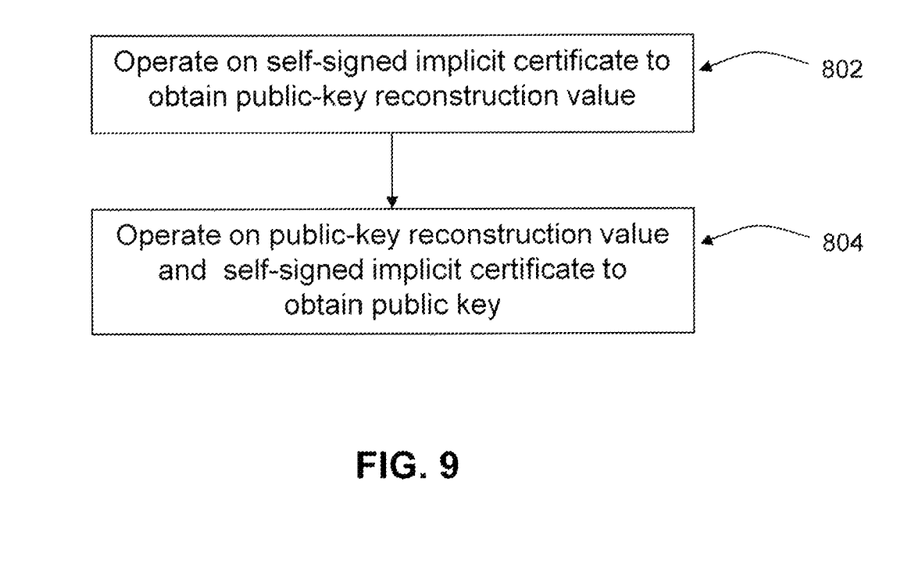
FIG. 9 is a schematic of yet another embodiment of a method of deriving a public key from a self-signed implicit certificate.

The computing device in FIG. 8 is the issuer of the self-signed implicit certificate. This issued self-signed implicit certificate can subsequently be operated on by another computing device in the cryptographic system to obtain the public key corresponding to the private key. This is shown in FIG. 9. First, in step 802, the another computing device operates on the self-signed implicit certificate to obtain the public-key reconstruction value. Then, in step 804, the another computing device operates on the self-signed implicit certificate and the public-key reconstruction value in its cryptographic unit to obtain the public key.

What is claimed is:

1. A method of generating a first and a second private key and establishing a first and a second self-signed implicit certificate that can be operated on to obtain a first and a second corresponding public key, said method being performed by a computing device in a cryptographic system based on an underlying group of order n, said computing device having a cryptographic unit, said method comprising:
   said computing device obtaining a long-term private key and a corresponding public-key reconstruction value;
   said computing device obtaining a first and a second data;
   said computing device operating on said public-key reconstruction value and said first data to obtain said first self-signed implicit certificate;
   said computing device operating on said public-key reconstruction value and said second data to obtain said second self-signed implicit certificate;
   said computing device operating on said long-term private key and said first self-signed implicit certificate to obtain said first private key; and
   said computing device operating on said long-term private key and said second self-signed implicit certificate to obtain said second private key.

2. The method of claim 1, wherein said computing device is a certification authority device that issues certificates in said cryptographic system, said first and said second data are first and second certificate data, said first and said second private key are respectively a first and a second root private key, and said first and said second public key are respectively a first and a second root public key.

3. The method of claim 2, wherein said operating on said public-key reconstruction value and said first certificate data to obtain said first self-signed implicit certificate comprises concatenating information derived from said public-key reconstruction value with said first certificate data.

4. The method of claim 3, wherein said information derived from said public-key reconstruction value is a compressed version of said public-key reconstruction value.

5. The method of claim 2, wherein said first root private key is an integer of form $k_{CA_{root}} = er_{CA} + r \pmod{n}$, and wherein $r_{CA}$ is said long-term private key, e is an integer derived using a hash of said self-signed implicit certificate, and r is an integer.

6. The method of claim 5 wherein said integer r is either 0, 1, or $r_{CA}$.

7. The method of claim 2 wherein said first certificate data includes validity information corresponding to said first self-signed implicit certificate.

8. The method of claim 2 further comprising said certification authority device incorporating time-sensitive information into said first certificate data, and said certification authority device updating said first self-signed implicit certificate on a periodic basis according to said time-sensitive information.

9. The method of claim 1 wherein said first public key corresponds to a first security domain and said second public key corresponds to a second security domain.

10. A device for generating a first and a second private key and establishing a first and a second self-signed implicit certificate that can be operated on to obtain a first and a second corresponding public key, said device comprising a processor coupled to memory, said processor configured to:
   obtain a long-term private key and a corresponding public-key reconstruction value;
   obtain a first and a second data;
   operate on said public-key reconstruction value and said first data to obtain said first self-signed implicit certificate;
   operate on said public-key reconstruction value and said second data to obtain said second self-signed implicit certificate;
   operate on said long-term private key and said first self-signed implicit certificate to obtain said first private key; and
   operate on said long-term private key and said second self-signed implicit certificate to obtain said second private key.

11. The non-transitory computer readable medium of claim 10 for use in a certification authority device that issues certificates in a cryptographic system, said first and said second data are first and second certificate data, said first and said second private key are respectively a first and a second root private key, and said first and said second public key are respectively a first and a second root public key.

12. The non-transitory computer readable medium of claim 11, wherein said operating on said public-key reconstruction value and said first certificate data to obtain said first self-signed implicit certificate comprises concatenating information derived from said public-key reconstruction value with said first certificate data.

13. The non-transitory computer readable medium of claim 12, wherein said information derived from said public-key reconstruction value is a compressed version of said public-key reconstruction value.

14. The non-transitory computer readable medium of claim 11, wherein said first root private key is an integer of form $k_{CA_{root}} = er_{CA} + r \pmod{n}$, and wherein $r_{CA}$ is said long-term private key, e is an integer derived using a hash of said self-signed implicit certificate, and r is an integer.

15. The non-transitory computer readable medium of claim 14, wherein said integer r is either 0, 1, or $r_{CA}$.

16. The non-transitory computer readable medium of claim 11, wherein said first certificate data includes validity information corresponding to said first self-signed implicit certificate.

17. The non-transitory computer readable medium of claim 11, further comprising said certification authority device incorporating time-sensitive information into said first certificate data, and said certification authority device updating said first self-signed implicit certificate on a periodic basis according to said time-sensitive information.

18. A non-transitory computer readable medium for generating a first and a second private key and establishing a first and a second self-signed implicit certificate that can be operated on to obtain a first and a second corresponding public key, said non-transitory computer readable medium having stored thereon computer readable instructions for:
   obtaining a long-term private key and a corresponding public-key reconstruction value;
   obtaining a first and a second data;
   operating on said public-key reconstruction value and said first data to obtain said first self-signed implicit certificate;

operating on said public-key reconstruction value and said second data to obtain said second self-signed implicit certificate;

operating on said long-term private key and said first self-signed implicit certificate to obtain said first private key; and operating on said long-term private key and said second self-signed implicit certificate to obtain said second private key.

19. The non-transitory computer readable medium of claim 18, wherein said first public key corresponds to a first security domain and said second public key corresponds to a second security domain.

* * * * *